(12) United States Patent
Sawhney et al.

(10) Patent No.: US 9,152,870 B2
(45) Date of Patent: Oct. 6, 2015

(54) COMPUTER VISION AS A SERVICE

(71) Applicant: SRI International, Menlo Park, CA (US)

(72) Inventors: Harpreet Singh Sawhney, Princeton Junction, NJ (US); Jayakrishan Eledath, Robbinsville, NJ (US); Saad Ali, East Windsor, NJ (US); Bogdan C. Matei, Princeton Junction, NJ (US); Steven S. Weiner, Merion Station, PA (US); Xutao Lv, East Windsor, NJ (US)

(73) Assignee: SRI INTERNATIONAL, Menlo Park, CA (US)

( * ) Notice: Subject to any disclaimer, the term of this patent is extended or adjusted under 35 U.S.C. 154(b) by 32 days.

(21) Appl. No.: 14/212,237

(22) Filed: Mar. 14, 2014

(65) Prior Publication Data

US 2014/0270494 A1    Sep. 18, 2014

Related U.S. Application Data

(60) Provisional application No. 61/787,254, filed on Mar. 15, 2013.

(51) Int. Cl.
*G06K 9/66* (2006.01)
*G06K 9/00* (2006.01)
*G06K 9/62* (2006.01)

(52) U.S. Cl.
CPC .......... *G06K 9/00979* (2013.01); *G06K 9/6253* (2013.01)

(58) Field of Classification Search
None
See application file for complete search history.

(56) References Cited

U.S. PATENT DOCUMENTS

| 8,429,103 B1 | 4/2013 | Aradhye et al. |
| 8,965,104 B1* | 2/2015 | Hickman et al. ............. 382/153 |
| 2012/0140276 A1* | 6/2012 | Haba et al. .................. 358/1.15 |

OTHER PUBLICATIONS

Sawhney, Harpreet S., "Tools for 'Democratizing' Computer Vision," Presentation at the CVPR'2013 Vision, Industry & Entrepreneurship Workshop, Jun. 24, 2013, 17 pages.
Sawhney, Harpreet S., "Image Content Based Algorithm Performance Characterization and Recommendation," Feb. 7, 2014, 10 pages.
Matikainen, et al., "Model Recommendation for Action Recognition," The Robotics Institute, Carnegie Mellon University Google Research, Jun. 2012, 8 pages.
U.S. Appl. No. 61/787,254, filed Mar. 15, 2013.
Jammalamadaka, Nataraj, et al., "Has My Algorithm Succeeded? An Evaluator for Human Pose Estimators," ECCV 2012, Part III LNCS 7574, pp. 114-128, Oct. 2012, 15 pages.

* cited by examiner

*Primary Examiner* — Bhavesh Mehta
*Assistant Examiner* — David F Dunphy
(74) *Attorney, Agent, or Firm* — Barnes & Thornburg LLP; Thomas J. McWilliams; Edward F. Behm, Jr.

(57) ABSTRACT

A computer vision service includes technologies to, among other things, analyze computer vision or learning tasks requested by computer applications, select computer vision or learning algorithms to execute the requested tasks based on one or more performance capabilities of the computer vision or learning algorithms, perform the computer vision or learning tasks for the computer applications using the selected algorithms, and expose the results of performing the computer vision or learning tasks for use by the computer applications.

31 Claims, 6 Drawing Sheets

COMPUTER VISION AS A SERVICE

CROSS-REFERENCES TO RELATED APPLICATIONS

This application claims the benefit of and priority to U.S. Provisional Patent Application Ser. No. 61/787,254, filed Mar. 15, 2013, which is incorporated herein by this reference in its entirety.

GOVERNMENT RIGHTS

This invention was made in part with government support under contract number FA8750-12-C-0103, awarded by the Air Force Research Laboratory. The United States Government has certain rights in this invention.

BACKGROUND

In computer vision, mathematical techniques are used to detect the presence of and recognize various elements of the visual scenes that are depicted in digital images. Localized portions of an image, known as features, may be used to analyze and classify an image. Low-level features, such as interest points and edges, may be computed from an image and used to detect, for example, people, objects, and landmarks that are depicted in the image. Machine learning algorithms are often used for image recognition.

Computer vision capabilities can be provided by self-contained (e.g., vertical or shrink-wrapped) software applications, such as Goggles by GOOGLE, Inc., Image Search by GOOGLE, Inc., Bing Image Search by Microsoft Corp., and Kooaba's Image Recognition. Some computer vision applications utilize open source computer vision algorithm libraries, such as OpenCV.

BRIEF DESCRIPTION OF THE DRAWINGS

This disclosure is illustrated by way of example and not by way of limitation in the accompanying figures. The figures may, alone or in combination, illustrate one or more embodiments of the disclosure. Elements illustrated in the figures are not necessarily drawn to scale. Reference labels may be repeated among the figures to indicate corresponding or analogous elements.

DETAILED DESCRIPTION OF THE DRAWINGS

Figure 1:
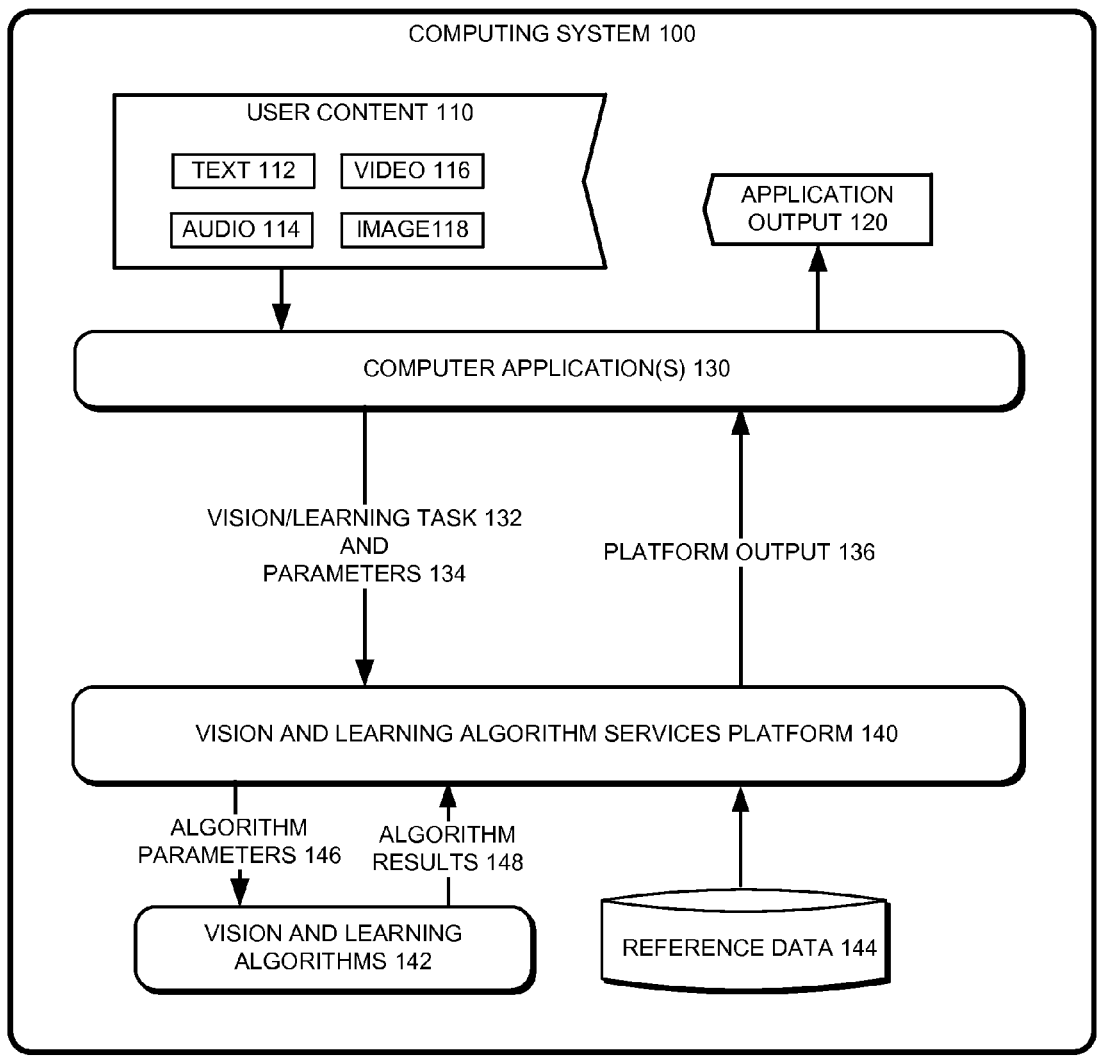
FIG. 1 is a simplified module diagram of at least one embodiment of a computing system for providing a computer vision service as disclosed herein.

While the concepts of the present disclosure are susceptible to various modifications and alternative forms, specific embodiments thereof are shown by way of example in the drawings and are described in detail below. It should be understood that there is no intent to limit the concepts of the present disclosure to the particular forms disclosed. On the contrary, the intent is to cover all modifications, equivalents, and alternatives consistent with the present disclosure and the appended claims.

Existing computer vision tools and applications are not generally accessible to address a broad range of computer application needs and performance requirements. Visual processing of and visual learning from large repositories of digital content (e.g., images, video and associated metadata) is increasingly needed. Unprecedented quantities of visual data are available online through Internet services (such as YOU-TUBE, FACEBOOK, news sites, and blogs), and the proliferation of such data is facilitated by mobile device cameras. This visual data can be a valuable tool for many different types of computer applications, including, for example, entertainment, travel, education, security, and disaster recovery applications. However, in order to expose the richness embedded in this visual data to computer applications "at large," many types of computer vision algorithms, machine learning algorithms, indexing algorithms, "big data" handling algorithms, and associated architectures need to be organized and optimized for various different computer vision and learning tasks. This task is large and complex, and thus extremely difficult for the traditional, self-contained applications to handle.

Referring now to FIG. 1, an embodiment of a vision and learning algorithm services platform 140 is embodied in a computing system 100. The illustrative platform 140 exposes the features and capabilities of a wide variety of computer vision, machine learning, and big data processing algorithms 142 for use by many different types of computer applications 130 at different levels of sophistication, depending on the needs of the particular application 130. Embodiments of the platform 140 can intelligently provide the needed vision and learning algorithm services to, for example, back-end, middleware, and/or customer-oriented computer applications. The inventors have further described some embodiments of the illustrative platform 140 in Sawhney, Harpreet S., "Tools for 'Democratizing' Computer Vision," and "Performance Characterization of Detection Algorithms: Enabling Parameter Selection, Probabilistic and Content-specific Reasoning," Presented at the IEEE Conference on Computer Vision and Pattern Recognition ("CVPR'2013") Vision, Industry & Entrepreneurship Workshop, dated Jun. 24, 2013, and in Sawhney, et. al., "Image Content Based Algorithm Performance Characterization and Recommendation," draft dated Feb. 7, 2014, both of which are incorporated herein by reference.

As used herein, "user-oriented application" may refer to, among other things, any of these types of computer applications, whether back-end, middleware, and/or customer-oriented computer applications, that has a need for computer vision, machine learning, big data processing, or similar tasks, but whose main focus or objective may be something other than performing computer vision, machine learning, or big data processing tasks. Such applications may include, for example, online travel and tourism services, photo recommenders, home furnishing recommenders, data-driven image and/or video content recommenders (e.g., for focused advertising), text recognition applications (e.g., for reading text in images and videos), and/or others. As used here, "application" or "computer application" may refer to, among other things, any type of computer program or group of computer programs, whether implemented in software, hardware, or a combination thereof, and includes self-contained, vertical, and/or shrink-wrapped software applications, distributed and cloud-based applications, and/or others. Portions of a computer application or application may be embodied as firmware, as one or more components of an operating system, a runtime library, an application programming interface (API), as a self-contained software application, or as a component of another software application, for example.

In operation, the computer application 130 interfaces with a person, such as an end user or application developer, e.g., by a user interface subsystem 622 (shown in FIG. 6, described below) of the computing system 100. From time to time, the computer application 130 receives or accesses user content 110, which is stored electronically (e.g., as digital files stored in a memory 614, 664 or a data storage device 618, 668). The user content 110 may include, for example, structured (e.g., meta tags) or unstructured (e.g., natural language) text 112, audio 114 (e.g., sounds and/or spoken dialog), video 116, and/or images 118 (e.g., a single image or a group or sequence of images). The computer application 130 may determine, e.g., by executing computer logic to identify the user content 110 or a characteristic thereof, that a computer vision or learning task needs to be performed. If the computer application 130 determines that a computer vision or learning task is to be performed, the computer application 130 formulates and submits the vision or learning task 132 to the platform 140. As used herein, a "task" may refer to, among other things, an activity, such as a vision or learning operation, to be performed by the computing system 100 on specified content 110. As such, a task can have parameters 134 that relate to, among other things, the specific content 110 to be processed by the computing system 100 in performing the task 132. In some embodiments, the task 132 involves executing one or more vision or learning algorithms on the user content 110 and returning a result of the algorithm execution to the requesting application 130. Alternatively or in addition, the task 132 may include a request to select an appropriate algorithm for use in processing particular content 110 and/or a request to determine an appropriate set of parameters to use with a particular algorithm in processing certain content 110. For example, portions of the platform 140 may function mainly as a developer's tool while other portions may operate as an online service directly accessible by applications 130 in operation (e.g., at load time or runtime).

Based on the task 132 and/or one or more parameters 134 relating to the task 132 (which may be supplied to the platform 140 by the application 130 as part of the task 132 or separately from the task 132), the platform 140 selects one or more of the vision and learning algorithms 142 to perform the task 132. As described in more detail below, the platform 140 may access reference data 144 in order to inform its algorithm selection process and/or to perform the requested task 132. For instance, the platform 140 may utilize reference data 144 to characterize and predict the capabilities of one or more of the algorithms 142 in relation to the particular task 132. The platform 140 executes or initiates the execution of the selected algorithm(s) 142 to perform the task 132 with the requisite algorithm parameters 146, receives algorithm results 148 (e.g., the output of the execution of the selected algorithm 142), and exposes platform output 136 (e.g., the algorithm results 148 and/or an "application friendly" version of the algorithm results 148) for use by the computer application 130.

In turn, the application 130 may process the platform output 136 according to the needs of the application 130 and, as a result, present application output 120. For example, if the task 132 requested by the application 130 is "recognize all of the faces in all of these images," the platform 140 may select an algorithm 142 based on parameters 134, where the parameters 134 may include the number of images 118 to which the task 132 relates, the quality and/or content of the images 118, the processing power of the available computing resources (e.g., mobile device or server), and/or the task type (e.g., face, object, scene, or activity recognition). The selected algorithm 142 performs the task 132 by, for instance, algorithmically extracting useful information from the images 118 and comparing the useful information for each of the images 118 to a portion of the reference data 144. The platform 140 may supply the matching images or information relating to the matching images (such as the name of each person recognized in each of the images 118, or a computer storage location at which the matching images can be accessed) to the application 130 as platform output 136. The application 130 may formulate the platform output 136 for presentation to an end user of the application 130. For instance, the application 130 may place the recognized persons' names on or adjacent to each image 118 and display the image 118 and recognized name on a display device of the computing system 100 (e.g., a display of the user interface subsystem 622, shown in FIG. 6 and described below), or the application 130 may invoke a text-to-speech processor to output the recognized persons' names as machine-generated speech audio. Alternatively or in addition, the application 130 may use the name information for a subsequent task, such as to perform a background check or to query other information relating to the person. The manner in which the application 130 ultimately utilizes the platform output 136 can vary depending on the requirements or design of the particular application 130.

Embodiments of the platform 140 ensure that the requested task 132 is completed within the requisite accuracy, quality, efficiency, and/or other parameters that may be specified by the application 130 as part of the task 132 and/or the parameters 134. As described in more detail below, any application 130 that has a need for vision or learning algorithm services can benefit from the use of the platform 140. In some implementations, revenue may be generated in response to the use of the platform 140 and/or the underlying algorithms 142 by various applications 130. For example, vendors of different vision and learning algorithms 142 may "compete" to have their algorithm selected by the platform 140 or by applications 130, and the selection of an algorithm may trigger a revenue event.

Figure 2:
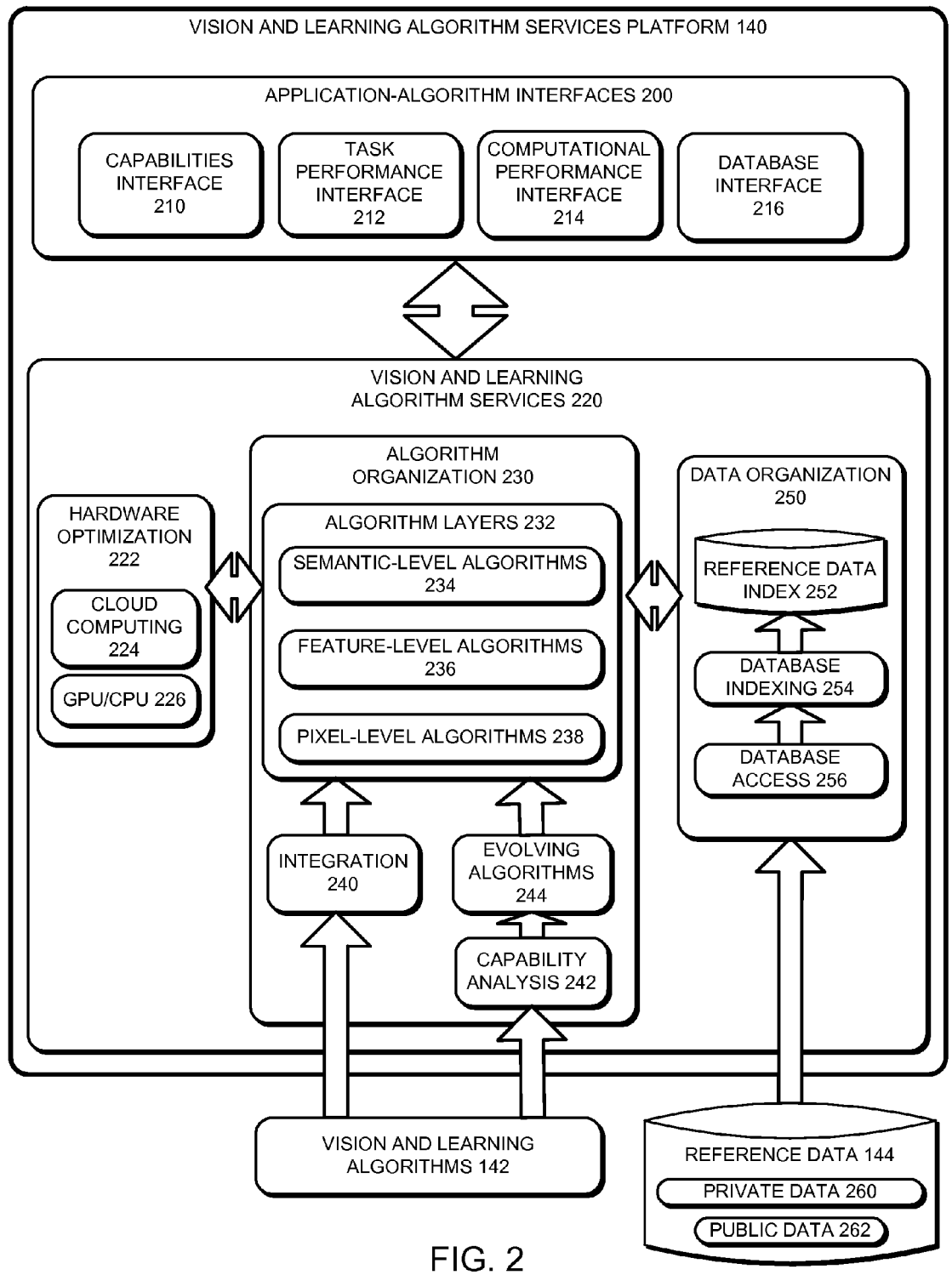
FIG. 2 is a simplified module diagram of at least one embodiment of the computer vision service of FIG. 1.

Referring now to FIG. 2, an embodiment of the vision and learning algorithm services platform 140 is shown in more detail, in the context of an environment that may be created during the operation of the computing system 100 (e.g., an execution or "runtime" environment). The illustrative platform 140 and portions thereof are embodied as a number of computer-executable modules, components, and/or data structures, including application-algorithm interfaces 200 and vision and learning services 220. The interfaces 200 can individually or collectively communicate with the application 130 at an "application" level and can communicate with one or more of the services 220 at an "algorithm" level (where the application level is typically a higher level of abstraction than the algorithm level). Some embodiments of the platform 140 may be implemented as an application programming interface (API) or as a collection of APIs, which is made available to applications 130 (or application developers) as an Internet-based service (e.g., a web service). The illustrative interfaces 200 include an algorithm capabilities interface 210, a task performance interface 212, a computational performance interface 214, and a database interface 216. The illustrative services 220 include a hardware optimization service 222, an algorithm organization service 230, and a data organization service 250. The interfaces 210, 212, 214, 216 and services 222, 230, 250 are described in more detail below.

The computer vision and learning algorithms 142 can have tens or sometimes hundreds of internal parameters 146 that control the flow and performance of the algorithms 142. Input and output data types for the algorithms 142 are often complex and heterogeneous. Such complex interfaces burden the algorithm user by requiring knowledge of the meaning and appropriate use of the algorithm parameters 146. The illustrative interface layer 200 functions as an intermediary between the applications 130 and the services 220. The interfaces 200 are designed to support the applications 130 in terms of intelligently selecting one or more of the available algorithms 142 that is capable of performing a particular task 132 given the parameters 134, based on, for example, the algorithms' capabilities, task performance, computational performance, and/or applicable databases. The algorithm capabilities interface 210 provides the applications 130 with access to one or a combination of the algorithms 142, the functional capabilities of each of the algorithms 142, and/or a means by which to control the algorithms 142 via parameters that are meaningful in terms of "real-world" characteristics (where such parameters may be referred to herein as "physical parameters" or "application parameters") (e.g., the parameters 134), rather than algorithm-centric parameters (e.g., the algorithm parameters 146). As an example, the use of Ground Sampling Distance may be considered a physical parameter/application parameter 134, while pixel resolution may be considered an algorithm parameter 146, which corresponds to the Ground Sampling Distance application parameter 134). In some cases, algorithm parameters 146 may be used to calculate application parameters 134, or vice versa.

The algorithm capabilities interface 210 enables these application-algorithm interactions through computerized abstractions that are designed to remain consistent, or change minimally, over the algorithm development cycles and across the algorithm implementations of different applications 130. To do this, the capabilities interface 210 utilizes APIs that have templated algorithms and abstract input and output data types. The APIs for the algorithms 142 may be developed using, for example, polymorphism, inheritance and template representations that allow a container type to hold multiple object-types and enable algorithm implementations to be independent of the container and object type, with a fixed API. Additionally, as described in connection with FIG. 3, an algorithms parameter mapping module 316 automatically associates the "real world" data characteristics of the application parameters 134 with the algorithm parameters 146 so that the algorithms 142 can be executed with the algorithm parameters 146 to produce algorithm results 148 for the requested task 132 and parameters 134.

The published performance characteristics of many existing vision algorithms are limited in that they are the result of the algorithms 142 having been run against certain specific public datasets. These datasets are often not tactically relevant for a wide variety of applications 130. Further, existing performance evaluations rarely characterize the algorithms 142 against fuzzy, compressed, and/or low-quality data, which is common on the Internet and is likely to be a common type of content 110 in many applications 130. The illustrative task performance interface 212 exposes the performance characteristics of an algorithm 142 in terms of the accuracy, precision, confidence, uncertainty, etc., of the algorithm results 148 for a specific task 132 and parameters 134. The platform 140 can customize the performance characteristics for a particular type of algorithm 142. The algorithm type may be defined by the functionality performed by the algorithm 142, such as object detection, face detection, scene detection, activity detection, event detection, vehicle detection, facial recognition, etc. The algorithm type may, alternatively or in addition, refer to a level of abstraction associated with the algorithm 142 (e.g., pixel-level, feature-level, semantic level, etc.). As an example, the performance of object detection algorithms can be characterized by metrics such as the probability of detection, the probability of false alarm, and the receiver operating characteristic (ROC) curves (resulting from the distribution of scores with respect to positive and negative instances). Similarly, the performance of localization algorithms can be characterized by uni- or multi-modal distributions of their output parameters, such as location and orientation of the camera. A computer vision algorithmic service as disclosed herein incorporates programming interfaces for these and all other types of algorithmic performance characterizations.

As described below with reference to FIG. 4, embodiments of the task performance interface 212 can provide performance estimates 426 at multiple levels of performance characterization, including: (1) a projected performance characterization that quantifies the algorithm's performance against known datasets; (2) a "probe," which rapidly analyzes input without running the full algorithm, e.g., to determine the algorithm's suitability for a particular task 132; and (3) a "diagnostic" characterization that characterizes the uncertainty of specific point solutions obtained by executing the algorithm 142. In this way, the task performance interface 212 can provide both coarse and fine performance measures on algorithms 142 to, among other things, aid in dynamic workflow optimization. The interface 212 may expose one or more of the estimates 426 for use by the platform 140 or the application 130. The computational performance interface 214 exposes information about the time taken and computing resources needed (e.g. hardware processors, cloud clusters, etc.) to execute an algorithm 142. Such information may be obtained from, for example, the hardware optimization service 222, described below. The database interface 216 enables applications 130 to access the indexed content 144 that is applicable to a given task 132 and parameters 134, in a rapid and efficient manner Additional details of the interfaces 210, 212, 214, 216 are described below.

Referring now to the vision and learning algorithm services 220, the algorithm organization service 230 is embodied as a computerized framework (e.g., as middleware) for the layered representation of vision and learning algorithms 142. The illustrative framework of algorithm layers 232 organizes the algorithms 142 into a pixel-level class of algorithms 238, a feature-level class of algorithms 236, and a semantic-level class of algorithms 234, where the feature-level algorithms 236 are implemented at a higher level of abstraction than the pixel-level algorithms 238 and the semantic-level algorithms 238 are implemented at a higher level of abstraction than the feature-level algorithms 236 and the pixel-level algorithms 238. For example, the illustrative pixel-level vision algorithms 238 may produce enhanced versions of input images and may extract camera characteristics; whereas the feature-level algorithms 236 may process images to combine feature aggregates and geometry for recognition; and the semantic-level algorithms 234 may ingest feature and pixel data to produce decisions, labels or tags, and semantic output. Additional examples of the layered framework 232 are shown in TABLE 1 below.

TABLE 1

Examples of algorithm layers.

| Organization | Algorithm Type | Example Algorithms |
| --- | --- | --- |
| Semantic-level Algorithms | WHERE-centric | Scene and Terrain Recognition; Semantic fingerprint-based recognition for geo-registration; Skyline matching and location recognition |
| | WHAT-centric | Recognition - vehicles, humans, weapons; Parts-based object recognition; Human pose-based object recognition; Vehicle fingerprinting |
| | WHO-centric | Face recognition; Soft-biometrics: gait, ethnicity, clothing |
| | WHEN-centric | Time estimation: sun angle analysis, shadow analysis; Season estimation: plant/foliage recognition, plant state analysis |
| Feature-level Algorithms | Features | Oriented histograms; Textons; Color histograms; Spin-images; Shape-context; Space-Time Interest Points (STIP) |
| | Geometry | 3D pose recovery; Parts-based geometry estimation |
| | Matching | Feature-based image matching; Point cloud matching; Image descriptors matching; Self-similarity |
| | Trackers | Multi-hypothesis tracking; Joint Probabilistic Data Association Filters (PDAF); Extended Kalman Filters; Flow tracking; Condensation |
| | Classifier Implementations | (Untrained) Support Vector Machines (SVMs); Random Forests; Decision trees |
| Pixel-level Algorithms | Image Enhancement | Local contrast normalization; Noise reduction; Blur estimation and removal Sharpening; Color correction; Color enhancement; Image de-compression; Image filtering; Pyramids |
| | Image Quality | Measures of image energy, texture, gradient strength |
| | Camera calibration/parameters | Vanishing lines; Multi-frame calibration |
| | Alignment | 2-dimensional (2D) direct motion analysis; Motion layers extraction; Flow estimation |

As shown in TABLE 1, each of the algorithm layers 232 is further organized by algorithm type. As such, the platform 140 or the application 130 can access any of the algorithms 142 by its level of abstraction and/or its type. Current open source libraries like OpenCV and VXL are organized around "textbook level" core image libraries, and tend to be very project-specific. Among other things, the layered architecture 232 can handle content diversity, can abstract computations and data structures for algorithm families rather than per atomic module, and can handle new versions of the algorithms 142 without changing the interfaces 200.

The illustrative integration service 240 integrates the algorithms 142 into the layered architecture 232. The illustrative capability analysis 242 evaluates the functional capabilities of new algorithms 142 or new versions of algorithms 142 and the illustrative evolving algorithms service 244 maps the new or new versions of algorithms 142 to an appropriate level 234, 236, 238 in the layered architecture 232

The reference data 144 may include a wide variety of different content, including the user content 110, which may be stored in databases, files, and/or other electronic data stores (which may be referred to herein simply as "data" or "databases" for ease of discussion). The reference data 144 may include private or protected data 260 and/or public or unprotected data 262. Referring now to the database interface 216 and the data organization service 250, the illustrative database interface 216 exposes information regarding the content databases of the reference data 144 that are available, what type of data each of the databases includes (e.g., area, sensors, biometric data) and the functional characteristics of each of the databases. Some other examples of reference data 144 include: (1) LIDAR (light detection and ranging data), aerial and ground level imagery (with and without any associated metadata); (2) polygonal and point cloud models of objects; (3) biometric and object databases; and (4) architectural, botanical, geological and meteorological databases. In general, the reference data 144 is stored in any suitable computer readable media, such as the data storage device 668 shown in FIG. 6 and described below.

The illustrative data organization service 250 is embodied as an extensible framework (e.g., middleware) for indexing algorithms to comprehensively and efficiently handle the diversity of databases and data stores of the reference data 144 that may be applicable to different applications 130. To do this, the data organization service 250 creates the reference data 144 by, for example, ingesting data from a large variety of databases and data stores (e.g., Internet sources such as YOUTUBE, FLICKR, FACEBOOK, etc.), where the "ingesting" may be performed by the computing system 100 as an automated (e.g., background) process or by interfacing with an end user, for example. The data organization service 250 automatically indexes this data, and provides database access interfaces 256 for the applications. For example, the database indexing module 254 of the data organization service 250 may create a reference data index 252 to index a collection of invariant two-dimensional and/or three-dimesional features as having been demonstrated for accuracy and efficiency. The database access module 256 may specify and/or verify appropriate permissions and/or access levels for the applications 130 to access the reference data 144, e.g., the private data 260. The reference data index 252 automatically indexes visual data and metadata from structured, semi-structured and unstructured data stores. In this way, the data organization service 250 can expose a large number of heterogeneous databases and/or data stores for use by the platform 140 or the application 130.

Some embodiments of the database interface 216 provide multiple types of abstracted APIs that allow unified access to different categories of indexed data, such as: (i) imagery data (e.g., Electro-Optic (EO), Multi-/Hyper-spectral Imagery (MSI/HSI), etc.), (ii) three-dimensional data (e.g., Light Detection and Ranging (LIDAR), Digital Elevation Maps (DEM)), (iii) attributes (e.g., color, class type, scene type), and (iv) features (e.g., Histogram of Oriented Gradients (HoG), spin-image), (iv) object, location, scene, action, event and other such database entity, for instance, faces from a biometric imagery database, locations from a geo-organized imagery database, and actions from an ingested and indexed action database from imagery. For each specific database 144, the database interface 216 exposes certain database information (e.g., as a summary table that contains among other fields: data type, spatial coverage, time interval (if available) and the number of elements in the database). Some embodiments of the database interface 216 include an interface to an index of high-dimensional visual and metadata features that enable rapid (typically logarithmic/sublinear) access to the categories of data types described above. The summary table can be used (e.g., by the platform 140 or an application 130) to quickly poll for types of data that are available within a given subject area, in order to create a workflow that is suitable for a particular task 132. An example of a database interface 216 is shown in TABLE 2 below.

TABLE 2

Database interface for an example location-matching query.

| Function | Input | Output |
|---|---|---|
| Query for availability of specific feature set for a given location | Location - latitude, longitude, altitude Area of coverage - M x N meter$^2$ Feature Type - Histogram of Oriented Gradients | (Boolean) Yes/No - Geo-referenced dataset available (Boolean) Yes/No - Desired feature set available |
| Retrieve geo-referenced data for visualization | Location - latitude, longitude, altitude Ground Sampling Distance - Nm/pixel | (Boolean) Yes/No - Data available Image - <Type> Geo-referenced image |

In addition to high-level information about the indexed data, the database APIs 216 allow applications or the platform 140 to poll the database 144 to retrieve stored data according to one or more criteria, such as: (i) spatial or volumetric (e.g., return all the images or skylines within a region of interest); (ii) attribute-based (e.g., return all the locations containing a desert scene); (iii) feature similarity (e.g., return all the skylines being similar to a query input); (iv) temporal access. More complex queries can be formed by creating combinations of the different query types.

In some implementations, the APIs 216 for image data use templated image classes to handle different pixel data types (e.g., color, gray scale, etc.). For three-dimensional (3D) data, abstracted 3D point interfaces similar to the open-source Point Cloud Library (PCL) from Willow Garage may be used. For accessing derived attributes and features, the interface 216 may be based on a templated class that comprises several fields, such as: feature identifier, 2D/3D feature location, origin identifier, and/or descriptor vector. More complex feature types can be constructed using, e.g., inheritance and polymorphism mechanisms to allow APIs to remain fixed.

Referring now to the hardware optimization service 222, the service 222 maps and optimizes vision and learning algorithms 142 for a variety of computing platforms 224, 226, which range from smartphones, personal computers, digital signal processors, and floating point graphics accelerators to server, cloud and multi-core graphics processing unit (GPU)/central processing unit (CPU) architectures. As such, the service 222 contains implementations of the algorithms 142 that are optimized for the different hardware platforms, e.g., GPU cores (e.g., CUDA—the Compute Unified Device Architecture), multi-threading CPU cores and parallel/distributed cloud architectures.

Figure 3:
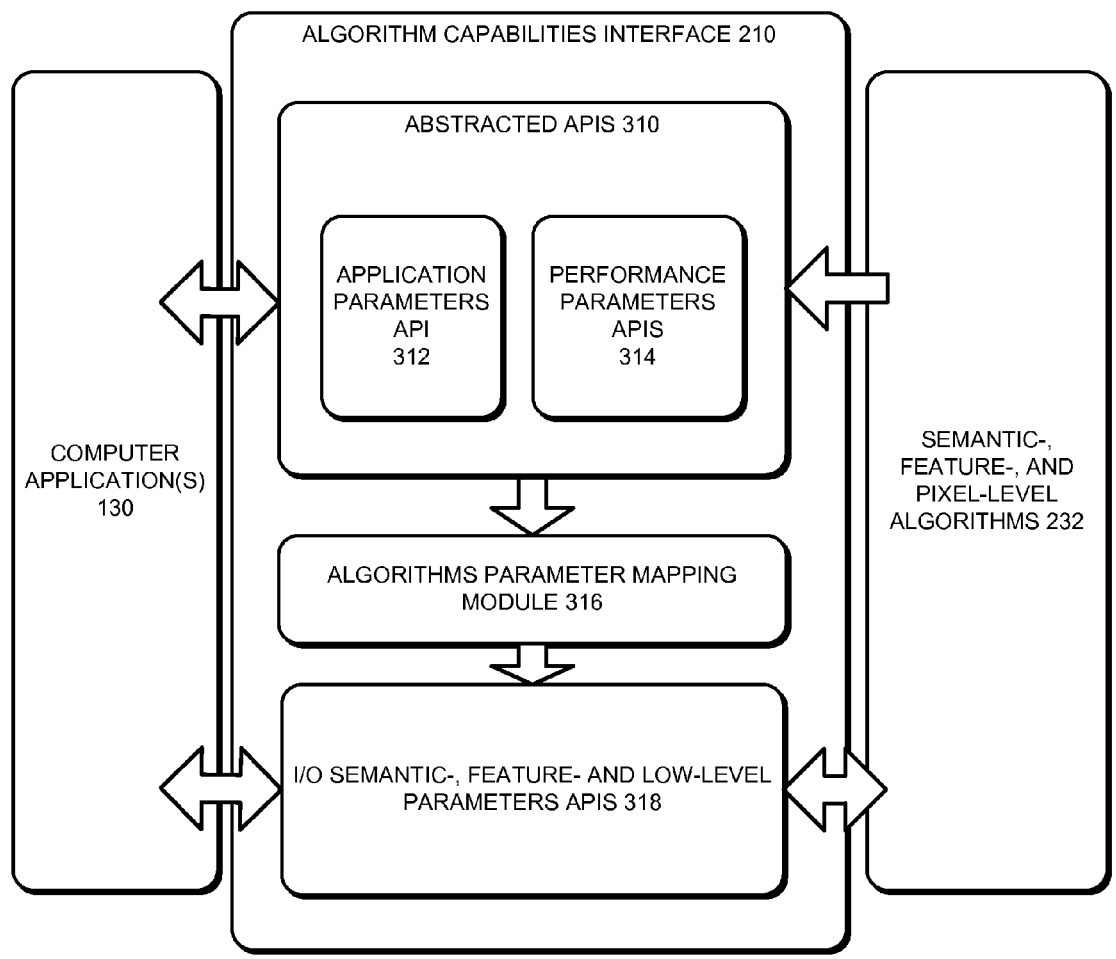
FIG. 3 is a simplified module diagram of at least one embodiment of the capabilities interface of FIG. 2.

Referring now to FIG. 3, an embodiment of the algorithm capabilities interface 210 is shown in more detail. The interface 210 includes a number of application parameters APIs 312 and performance parameters APIs 314. The APIs 312, 314 translate physical or user-oriented parameters (e.g., the parameters 134) to algorithm-centric parameters (e.g., the algorithm parameters 146). Additionally, the APIs 314 can be used to automatically determine a set of "optimal" algorithm parameters 146 for a particular task 132 and parameters 134. The physical or user-oriented parameters 134 may be computed by the application 130 or by the platform 140 from the task 132 (e.g., a query string) or may be specified by a user of the application 130 (e.g., an end user) or a user of the platform 140 (e.g., an application developer). As used herein, "optimal" may refer to, among other things, a combination of algorithm parameters 146 that is algorithmically determined to have a high probability of performing the task 132 according to the specified parameters 134, accuracy criteria, performance criteria, and/or other criteria.

The illustrative algorithm capabilities interface 210 is embodied as one or more APIs that encode: (i) the parameters 134 (e.g., physical input parameters for the task 132, such as parameters with real-world meaning rather than algorithm-specific meaning, e.g., Ground Sampling Distance (GSD), focal length, and blur level), and (ii) input and output parameters that specify a desired performance level for the algorithms 142 executing the task 132 or implementing the application 130. These APIs are abstracted and thus do not require the applications 130 to provide algorithm parameters 146. For example, an application 130 may provide only query image properties and desired performance parameters, and the platform 140 can automatically select an algorithm 142, determine the algorithm parameters 146, and produce the platform output 136 in response to those parameters, without requiring any additional information from the application 130.

To do this, the algorithms parameter mapping module 316 translates the parameters 134 (e.g., physical input parameters and input/output (I/O) performance parameters) into a set of I/O APIs 318 for interacting directly with the semantic-, feature and pixel-level algorithms 234, 236, 238. This mapping process utilizes the task performance interface 212 to map the parameters 134 to algorithm performance parameters 146. In doing this, the module 316 identifies a set of input parameters 146 that are mathematically determined to be likely to achieve a specific level of performance, as determined through systematic testing and evaluation of the algorithm 142's output over time. As an illustration, consider an interface for vehicle recognition. An application 130 needs a vehicle recognition service (e.g., the task 132 may be a query such as "find all vehicles in these images"). The platform 140 or the application 130 uses a combination of algorithms 142 to compute or otherwise determine the physical parameters of the task 132. The physical parameters can be provided by the application 130 (e.g. distance to an object) or computed by a vision or learning algorithm 142 based on one or more of the algorithm parameters 146. The platform 140 or the application 130 invokes the capabilities interface 210 with these parameters 134. The algorithms parameters mapping module 316 maps these parameters to a complete set of (i) semantic-level parameters (e.g., classifier type, classifier parameters); and (ii) feature-level parameters (e.g., feature type). The platform 140 selects and executes a semantic-level algorithm 234, which produces results 148 using the semantic-level parameters, and the platform 140 passes the results 148 to the application 130 as platform output 136. Additionally, the platform 140 may select and execute a feature-level algorithm 236, which produces results 148 using the feature-level parameters, and the platform 140 passes the results 148 to the application 130 as platform output 136. Some illustrative examples of algorithm-parameter mappings that may be performed by the algorithm capabilities interface 210 are shown in TABLE 3 below.

TABLE 3

Capability interface for example WHERE-centric location-matching algorithms.

| Algorithm Organization | Function (e.g., task 132) | Input Parameters 134 | Output Parameters 136 |
| --- | --- | --- | --- |
| Semantic | Retrieve Similar Images | <vector> Histogram of Oriented Gradients (HoG) feature (double) GSD, zoom level | Pointers to locations of reference images with similar HoG features, and at the desired resolution (zoom) |
| Feature | Compute HoG features at building corners | Image Edge Map Feature Type - "HoG" Window size - 10 (pixels) | <vector> HoG features |
| Pixel | Edge detection | Image query image Edge algorithm "Canny" Window size - 3 (pixels) | Image - Edge Map |

Figure 4:
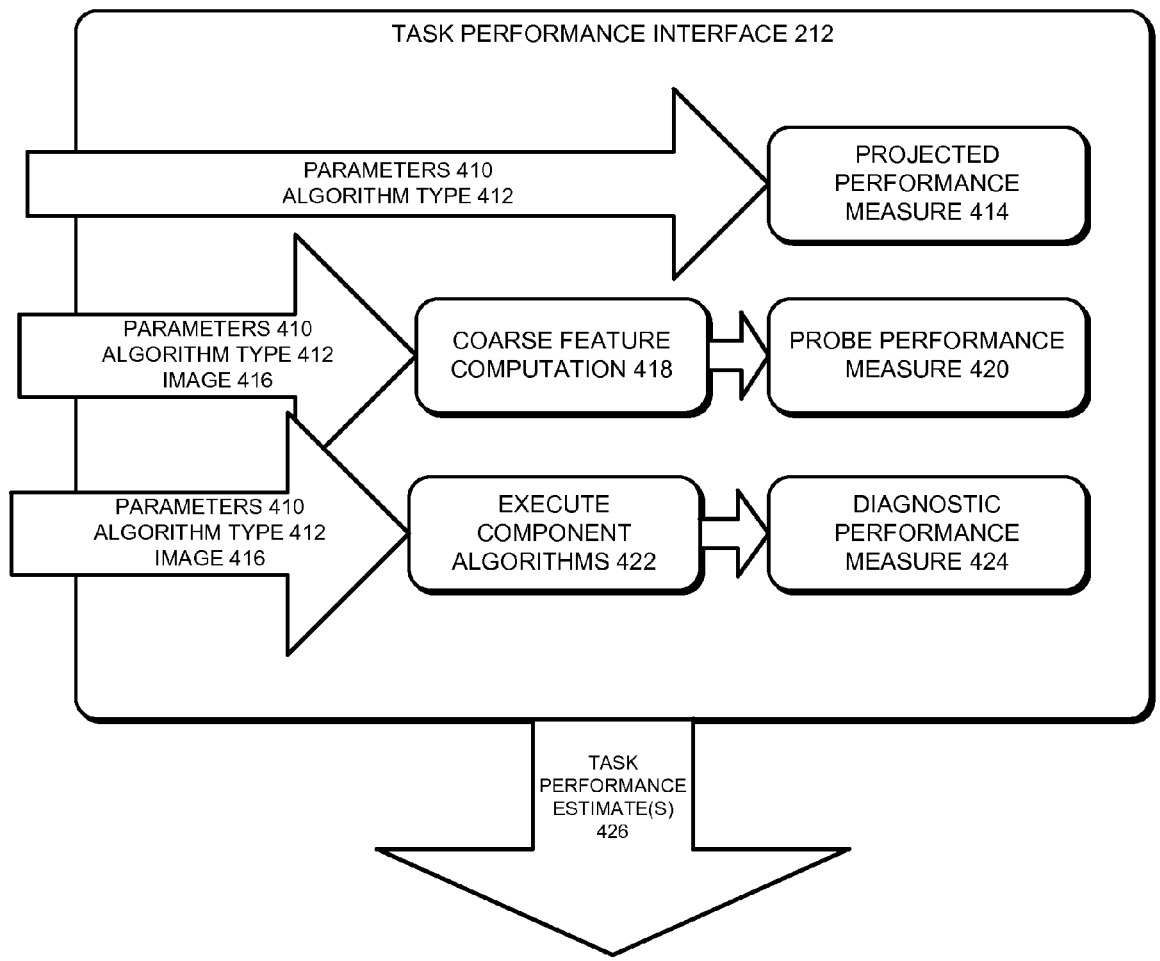
FIG. 4 is a simplified module diagram of at least one embodiment of the task performance interface of FIG. 2.

Referring now to FIG. 4, an embodiment of the task performance interface 212 is shown in more detail. The illustrative task performance interface 212 provides algorithm performance estimates that enable the platform 140 or the application 130 to obtain an "optimal" result 148 in response to a task 132 and parameters 134 (e.g., an answer to a query). To do this, the platform 140 constructs a workflow for accomplishing the task 132 according to applicable task performance constraints (e.g., the image quality and/or computational constraints), which may be supplied by the task performance interface 212. The interface 212 determines performance estimates based on characteristics of the known datasets 144 and the operating range of the parameters 134 that are specific to the task 132 (e.g., an image query). Furthermore, the interface 212 enables the platform 140 or the application 130 to perform a quick "triage" of task 132 or the associated content 110 to assess the landscape of potential solutions for the task 132. As a result of the triage, the platform 140 or the application 130 can select one or more algorithms 142 for full execution that output confidences in the specific solution produced. In other words, once an algorithm is picked and the solution is obtained, the quality of the solution is characterized (as performance characterization) and provided to the platform 140 or the application 130, as needed.

Some embodiments of the task performance interface 212 describe performance characteristics as functions of properties of the content 110 (e.g., image and scene properties, such as ground sample distance (GSD), image blur, and contrast) that are associated with a task 132. To do this, the content properties (e.g., scene and image properties) are extracted from the content 110 (e.g., query images). One or more of the extracted content properties are used to characterize the algorithm 142's performance and to recommend parameters for improved performance. To do this, the algorithm 142's performance is learned over a data cluster that is based on the extracted image feature content and attributes. Based on the learning, a set of parameters is recommended for performing the algorithm on a new image (e.g., an image that is not already represented in the cluster), based on the parameters' performance in the cluster. Local image features are computed for the image, to capture the image content, and then all of the images in a dataset of images are clustered using the feature similarity. A ratings matrix may be computed to estimate the algorithm's performance over the clusters for each combination of parameters (where a combination of parameters may be referred to as an "operating point"). In this way, a new image can be related to a cluster having a similar feature distribution, and the predicted best operating point of the matching cluster can be used as the algorithm parameters 146. To perform the clustering, the images in the dataset are clustered according to similar content and attributes using, for example, a k-means clustering algorithm.

As shown in FIG. 4, the illustrative task performance interface gives the platform 140 or the application 130 multiple ways to estimate the performance of an algorithm 142, and thereby helps the platform 140 or an application 130 in selecting candidate algorithms 142 for the task 132. A projected performance measure 414 gives a global estimate in response to parameters 410 and the algorithm type 412 (which may be determined by the capabilities interface 210 as described above, where the parameters 410 may include the application parameters 134, the algorithm parameters 146, or a combination of the parameters 134, 146, and the algorithm type 412 may be determined according to the algorithm layers framework 232). The projected measure 414 does not use any inputs from the given content 110 (e.g. a query image 416). As such, the projected measure 414 quantifies performance against known datasets and the resulting estimate 426 is not particular to the content 110.

A probe performance measure 420 uses the actual content 110 (e.g., an image 416) to predict uncertainty relating to the algorithm's performance of the task 132 using coarse feature computations 418. The probe measure 420 can rapidly assess the space of possible solutions (e.g., a set of candidate algorithms 142). A diagnostic performance measure 424 assesses the final results of executing the algorithm 142 (selected based on the algorithm type 412) on the content 110 (e.g., an image 416) to perform the task 132 using the parameters 410. In this way, the task performance interface 212 enables multiple-level data-driven performance characterization of algorithms 142 for a specific task 132 submitted by an application 130. As a result, applications 130 or the platform 140 can obtain both coarse and fine performance measures to dynamically optimize their processing pipelines by evaluating multiple algorithms (e.g., a set of candidate algorithms 142).

As an example, for a given skyline matching algorithm 142, the projected measure 414 provides the ranges of achievable location uncertainty with respect to parameters computed from images in the existing datasets. The projected measures 414 are pre-computed for the respective algorithms 142 as part of training and testing stages of the algorithms 142. For a task 132 involving a "where" query, given skyline and building outlines, without performing detailed matching, the probe measure 420 informs the platform 140 or the application 130 as to whether the achievable geo-location uncertainty is, e.g., 10000 sq. kms or 100 sq. kms. The probe measure 420 produces estimates using global properties of the content 110 (e.g., a query image 416), such as scene type (e.g., desert, shoreline, rural), resolution, contrast, blur and also coarse level properties of features related to the specific task 132 or the particular application 130. For example, the jaggedness of a skyline is a good indication of how well a skyline-based "where" algorithm is likely to work. Similarly, the number of distinctive corners available in an urban image will determine the expected uncertainties in its location. The probe measure 420 mimics human-like abilities by training the system 100 to make high-level estimates from global and application-specific features of the task 132 (e.g., query 416).

An embodiment of the probe measure 420 can be implemented in multiple stages, including (i) an offline technique for learning the mapping between the image properties and the estimates obtained by running the respective algorithms on labeled examples, and (ii) an incremental technique that can refine its mapping by adding a new image, its properties, and its results. The probe measure 420 can dynamically update its predictions by incorporating the results for images previously analyzed by the platform 140 or by an application 130. Given the learned mapping, the probe module 420 computes the global and application-specific features of a test image and applies the mapping to generate estimates of the expected accuracy and confidence.

The estimates 426 produced by the diagnostic measure 424 are computed from the complete configuration of matching features in module 422, and determined by combining their confidences and accuracies into summary estimates in module 424. The diagnostic measure 424 analyzes the results of component algorithms 142 to estimate a confidence and accuracy for the whole task 132. This analysis is different for each task 132 or for each application 130. For example, when a semantic fingerprint is used to answer a "where" task (e.g., query) with respect to an image 416, the diagnostic prediction method 424 combines the confidences and accuracies associated with each semantic feature detected in the image 416 (such as a building, road, and mountain), and forms a confidence and accuracy for the whole image 416. When a face detection algorithm is used, for example, to answer a "who" task (e.g., query), the diagnostic measure 424 reports the expected recall, precision, and confidence of the selected algorithm 142 for the database used. TABLE 4 below summarizes typical inputs used and output interfaces for the task performance measures 414, 420, 424.

TABLE 4

Summary of task performance measures and their input/output interfaces.

| Measure | Typical Inputs Used | Typical Output Interface |
|---|---|---|
| Projected | Global Properties, Stored Datasets (Pre-computed) | <$P_D$, $P_{FA}$, Location Uncertainties, . . .><br>$P_D$, $P_{FA}$ → Detection & False Alarm Probabilities |
| Probe | Global and App-specific features computed from the Query Image | Ranges of <Recall, Precision, Location Uncertainties, . . .> |
| Diagnostic | Detailed Query Image Properties | < $P_D$, $P_{FA}$, Confidences, Location Uncertainties, . . .> at the Solution Points |

Referring back to FIG. 2, an embodiment of the computational performance interface 214 provides estimates of the computational resources required by each algorithm 142 to help construct a pipeline to meet the resource constraints specified by the application 130 (or the application developer). For instance, the interface 214 can provide estimates of the computational requirements for the algorithms when they are executed on different processing configurations, such as cloud computers with GPUs, or enable profiling techniques to recognize when two or more algorithms 142 perform the same computations, so that an analysis can be performed once and shared, in order to save time or for other reasons.

Traditionally, computational complexity is characterized in terms of algorithmic complexity. While useful, this characterization is not sufficient for the platform 140 or the application 130 to make an informed decision about resource allocation because it does not lead to an accurate estimate of processing time in a cloud architecture, which has diverse computational resources, including different types of CPUs and GPUs. The computational performance interface 214 provides a variety of computation-specific information for each algorithm 142, as shown by the example in TABLE 5 below.

TABLE 5

Computational performance measures and their input/output interfaces.

| Measure | Typical Inputs Used | Typical Output Interface |
|---|---|---|
| Projected | Global Properties, Stored Datasets (Pre-computed), Resources (CPUs, GPUs) | (CPU, GPU) Average execution time; Memory usage<br>(Cloud) Average execution time; Memory usage; Latency |
| Diagnostic | Image Properties; Resources (CPUs, GPUs, Datasets/Databases) | (CPU, GPU) Actual execution time; Memory usage<br>(Cloud) Actual execution time; Memory usage; Latency |

The illustrative interface 214 lists the processing (e.g., CPU, GPU) and memory requirements to execute an algorithm 142 at different levels. For example, a projected level may characterize the algorithm's processing time with respect to known datasets 144, and a diagnostic level may characterize the computational resources used by the executed algorithm. In some embodiments, components of the interface 214 are implemented using a framework for managing processing flows, such as a Hadoop/UIMA-based infrastructure or any of the standard cloud-based distributed/parallel processing infrastructures. The interface 214 can use the UIMA (Unstructured Information Management Architecture) to define processing pipelines for an algorithm 142, each of which may involve multiple types of computing resources (e.g., hardware). The interface 214 can use Hadoop to replicate these function blocks and to distribute data to them. With this framework, when it is time to execute an algorithm, the platform 140 or the application 130 can specify resources and/or a processing graph using XML (Extensible Markup Language)-based configurations. The interface 214 can, for example, choose among multiple processing options, replicate function blocks, and distribute computation across the cloud at runtime.

As an example, consider a feature extraction algorithm that uses the Harris corner detector and Histogram-of-Oriented-Gradients (HoG) feature descriptor. Through the interface 214, the platform 140 can determine that the algorithm can be executed using single-core CPU, multi-core CPU or GPU hardware, and can analyze the time taken for each. Since both Harris corners and HoG compute first-order gradients, this computation only needs to be done once for the feature extraction algorithm. The benefit of this optimization, compared to independently using Harris detectors and HoG descriptors, is exposed through the computational performance interface 214.

Figure 5:
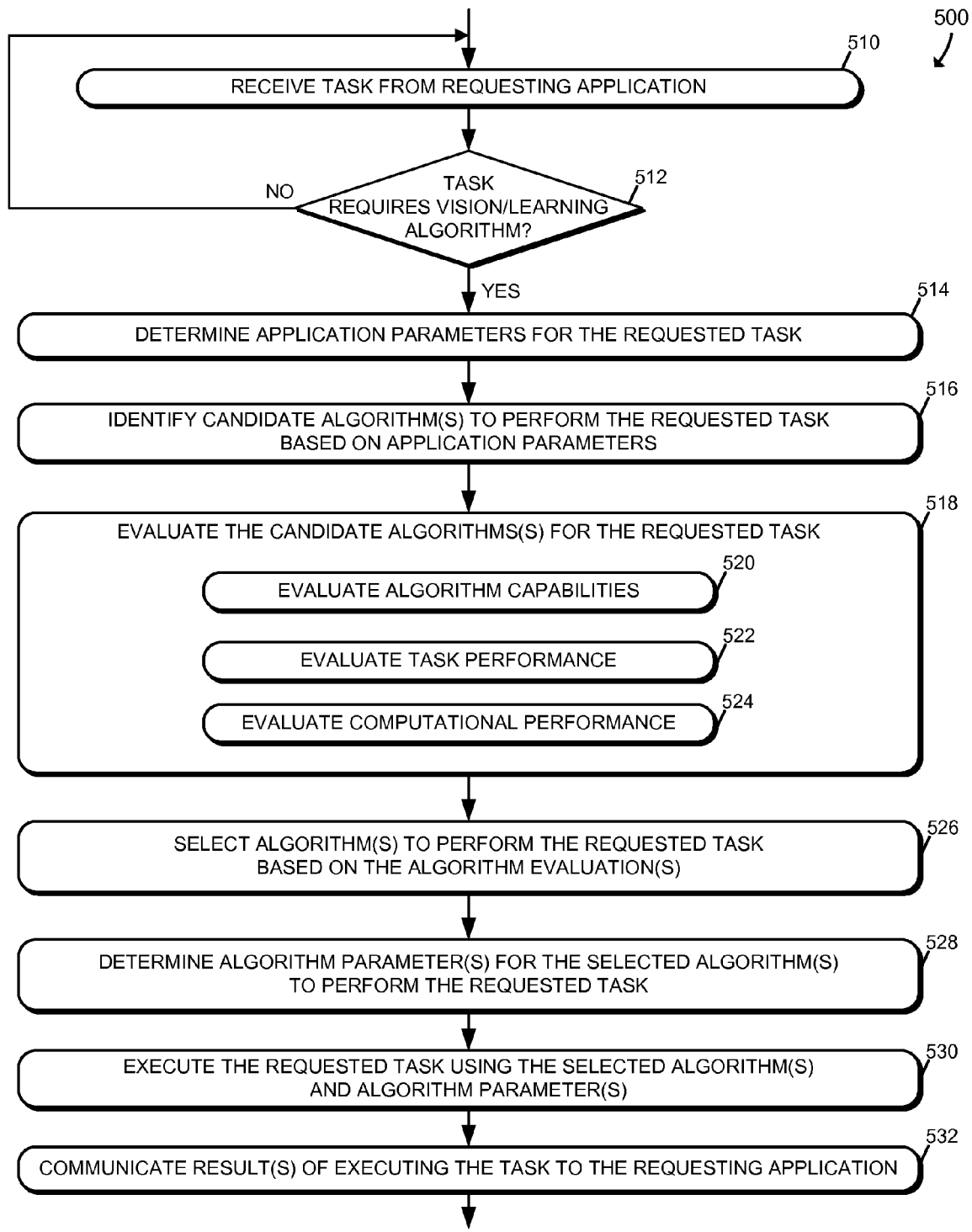
FIG. 5 is a simplified flow diagram of at least one embodiment of a method by which the computing system of FIG. 1 may handle a computer vision or machine learning task requested by a computer application.

Referring now to FIG. 5, an illustrative method 500 by which the computing system 100 may perform vision or learning algorithm services for an application 130 on content 110 is shown. The method 500 may be embodied as computerized programs, routines, logic and/or instructions executed by the computing system 100, for example by the platform 140. At block 510, the system 100 receives a computer vision or machine learning task 132 from a requesting application 130. To do this, the requesting application 130 may submit the task 132 using one or more of the application-algorithm interfaces 200 (e.g., the capabilities interface 210), or may use one or more of the APIs 312, 314, 318, depending on the needs and/or level of sophistication of the application 130. At block 512, the computing system 100 determines whether the task 132 requires the use of one of the algorithms 142. If the requested task does not require the use of an algorithm 142 (as may be the case if, for example, the task 132 cannot be handled by any of the available algorithms 142), the system returns to block 510 and monitors for another task 132 (which may be received from the same application 130 or a different application 130, depending on the design or implementation of the platform 140). If the task 132 requires the use of an algorithm 142, the system 100 determines the application parameters 134 for the requested task 132, at block 514. To do this, the system 100 may, for example, extract the parameters 134 from a query string of the requested task 132. At block 516, the system 100 identifies one or more candidate algorithms to perform the requested task based on the application parameters 134 determined at block 514, where the candidate algorithms comprise a subset of the library of algorithms 142. To do this, the computing system 100 may analyze the parameters 134 to determine an appropriate level of algorithm abstraction using the algorithm organization service 230. In some embodiments, the system 100 may simply return a list of the candidate algorithms 142, depending on the needs of the requesting application 130. In other embodiments, the system 100 proceeds to intelligently analyze the capabilities of the candidate algorithms vis a vis the requested task 132, as described below.

The algorithm and performance capabilities of the candidate algorithms 142 identified at block 516 are evaluated for the requested task 132, at block 518. To do this, the computing system 100 may utilize the capabilities interface 210 (at block 520), the task performance interface 212 (at block 522), the computational performance interface 214 (at block 524), and/or one or more of the services 220, as described above. At block 526, the computing system 100 compares the results of the evaluating of the algorithm and performance capabilities of the candidate algorithms 142 and selects one or more of the algorithms 142 to perform (e.g., fully execute) the task 132 on the content 110. In some embodiments, the system 100 may simply return the selected algorithm(s) 142, or a list of the selected algorithm(s), depending on the needs of the requesting application 130. In other embodiments, the system 100 proceeds to intelligently determine a set of parameters for the selected algorithm(s) 142 in view of the requested task 132, as described below.

At block 528, the system 100 determines the "optimal" algorithm parameters 146 to execute the algorithm(s) 142 selected at block 526 on the particular content 110 that is the subject of the task 132. For example, the system 100 may perform content-based performance characterization, wherein attributes of the content 110 may be extracted and clustered with a dataset of previously-analyzed content, to identify the algorithm parameters 146. In some embodiments, the system 100 may simply return the algorithm parameters 146, depending on the needs of the requesting application 130. In other embodiments, the system 100 proceeds to execute the selected algorithm(s) 142 using the parameters 146, as described below.

At block 530, the system 100 executes the task 132 using the selected algorithms 142 and the algorithm parameters 146 determined at block 528, and obtains the algorithm results 148. To do this, the system 100 may initiate the executing of the algorithms 142 through an API, such as one or more of the APIs 310, 318. At block 532, the system 100 communicates the results 148 of performing the task 132 with the selected algorithms 142 as output 136 to the requesting application 130. To do this, the system 100 may expose the results 148 as output 136 through one or more of the interfaces 200 or through one or more of the APIs 310, 318, for use by the application 130. As used herein, "expose" may refer to the action of making information or computer functionality available for use by other applications, by some computerized mechanism (e.g., through an API, or through a message communication mechanism).

Example Usage Scenarios

Among other things, the platform 140 can be used to combine existing vision and/or learning techniques in new ways to adapt to evolving algorithmic and software needs. For example, the platform 140 can combine shadow detection, object recognition, and an ephemeris module to create a technique for estimating the time at which a picture was taken, by using detected objects as sundials. The platform 140 also has a number of military, intelligence and commercial applications.

Alternatively or in addition, the platform 140 can be used to provide performance characteristics of algorithms 142 for ranges of operating parameters that cover image quality, scene complexity and clutter, and object and scene oriented parameters. Accordingly, the platform 140 can help developers and practitioners to create objective assessments of algorithms 142 and operating ranges for the algorithms 142 to be used in real-time by mainstream applications.

Implementation Examples

Figure 6:
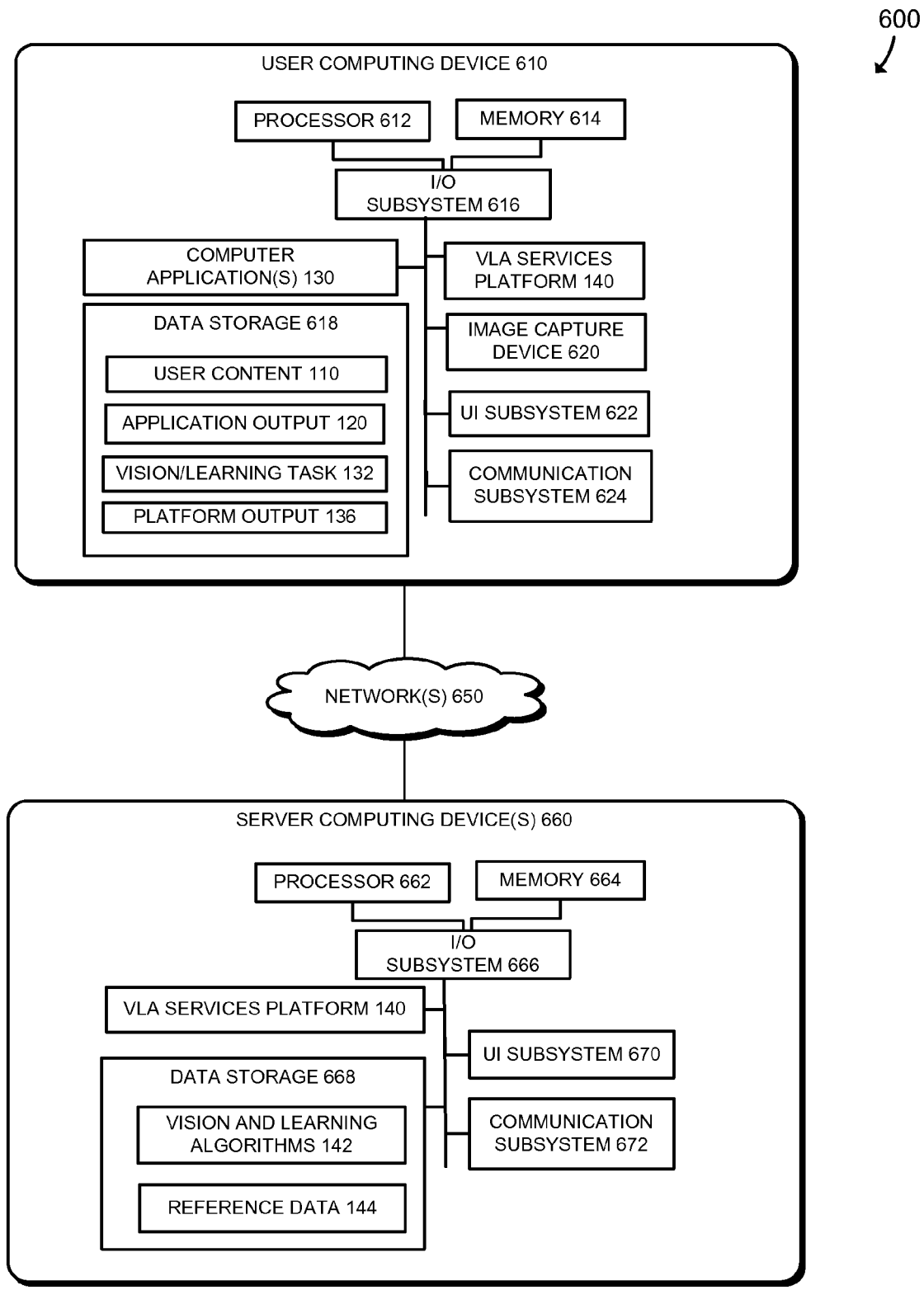
FIG. 6 is a simplified block diagram of an exemplary computing environment in connection with which at least one embodiment of the computing system of FIG. 1 may be implemented.

Referring now to FIG. 6, a simplified block diagram of an embodiment 600 of the computing system 100 is shown. While the illustrative computing system 600 is shown as involving multiple components and devices, it should be understood that in some embodiments, the computing system 600 may constitute a single computing device, alone or in combination with other devices. The computing system 600 includes a user computing device 610, which may be in communication with one or more other computing systems or devices 660 via one or more networks 650. The vision and learning services platform 140 or portions thereof may be distributed across multiple computing that are connected to the network(s) 650 as shown. In other embodiments, however, the platform 140 may be located entirely on the computing device 610. In some embodiments, portions of the platform 140 may be incorporated into other systems or computer applications. Such applications or systems may include, for example, operating systems, middleware or framework software, and/or applications software. For example, portions of the platform 140 may be incorporated into or accessed by search engines or intelligent assistance applications.

The illustrative computing device 610 includes at least one processor 612 (e.g. a microprocessor, microcontroller, digital signal processor, etc.), memory 614, and an input/output (I/O) subsystem 616. The computing device 610 may be embodied as any type of computing device capable of performing the functions described herein, such as a personal computer (e.g., desktop, laptop, tablet, smart phone, body-mounted device, etc.), a server, an enterprise computer system, a network of computers, a combination of computers and other electronic devices, or other electronic devices. Although not specifically shown, it should be understood that the I/O subsystem 616 typically includes, among other things, an I/O controller, a memory controller, and one or more I/O ports. The processor 612 and the I/O subsystem 616 are communicatively coupled to the memory 614. The memory 614 may be embodied as any type of suitable computer memory device (e.g., volatile memory such as various forms of random access memory).

The I/O subsystem 616 is communicatively coupled to a number of hardware components and/or other computing systems including the computer application(s) 130, the platform 140, and the user interface subsystem 622, which includes one or more user input devices (e.g., a touchscreen, keyboard, virtual keypad, microphone, etc.) and one or more output devices (e.g., speakers, displays, LEDs, etc.). The I/O subsystem 616 is also communicatively coupled to one or more storage media 618, one or more one or more video and/or still image capture devices 620 (e.g., cameras), and a communication subsystem 624. It should be understood that each of the foregoing components and/or systems may be integrated with the computing device 610 or may be a separate component or system that is in communication with the I/O subsystem 616 (e.g., over a network 650 or a serial bus connection).

The storage media 618 may include one or more hard drives or other suitable data storage devices (e.g., flash memory, memory cards, memory sticks, and/or others). In some embodiments, portions of the application(s) 130, the platform 140, the user content 110, the application output 120, the task 132, the platform output 136, and/or other data reside at least temporarily in the storage media 618. Portions of the application(s) 130, the platform 140, the user content 110, the application output 120, the task 132, the platform output 136, and/or other data may be copied to the memory 614 during operation of the computing device 610, for faster processing or other reasons.

The communication subsystem 624 may communicatively couple the computing device 610 to one or more communication networks, e.g., a local area network, wide area network, personal cloud, enterprise cloud, public cloud, and/or the Internet, for example. Accordingly, the network interfaces 632 may include one or more wired or wireless network interface software, firmware, or hardware, for example, as may be needed pursuant to the specifications and/or design of the particular computing system 600.

The server computing device(s) 660 may be embodied as any suitable type of computing device capable of performing the functions described herein, such as any of the aforementioned types of devices or other electronic devices. For example, in some embodiments, the server computing device(s) 660 may include one or more server computers including storage media 668, which may be used to store portions of the vision and learning algorithms 142, the reference data 144, the application(s) 130, the platform 140, the user content 110, the application output 120, the task 132, the platform output 136, and/or other data. The illustrative server computing device 660 also includes a user interface subsystem 670 and a communication subsystem 672, which may be embodied similarly to the components 622, 624, respectively, described above. The computing system 600 may include other components, sub-components, and devices not illustrated in FIG. 6 for clarity of the description. In general, the components of the computing system 600 are communicatively coupled as shown in FIG. 6 by signal paths, which may be embodied as any type of wired or wireless signal paths capable of facilitating communication between the respective devices and components.

ADDITIONAL EXAMPLES

Illustrative examples of the technologies disclosed herein are provided below. An embodiment of the technologies may include any one or more, and any combination of, the examples described below.

In an Example 1, a platform for providing computer vision algorithm services is embodied in one or more machine accessible storage media and includes an application-algorithm interface to: receive a computer vision task from a computer application, the computer vision task to be performed on one or more digital images accessed by the computer application; determine one or more parameters relating to the performing of the computer vision task on the one or more digital images; select one or more computer vision algorithms from a library of computer vision algorithms based on capabilities of the computer vision algorithms that have a high level of performance in comparison to the capabilities of the other computer vision algorithms in the library of computer vision algorithms to perform the computer vision task on the one or more digital images with the one or more parameters; and expose, for use by the computer application, output of the selected computer vision algorithm performing the computer vision task on the one or more digital images using the one or more parameters.

An Example 2 includes the platform of Example 1, wherein the platform is to execute one or more algorithm performance characterization techniques to determine the one or more parameters relating to the performing of the computer vision task. An Example 3 includes the platform of Example 2, wherein the platform is to map one or more application parameters supplied by the computer application to one or more algorithm parameters of the selected computer vision algorithms based on the executing of the one or more algorithm performance characterization techniques. An Example 4 includes the platform of any of Examples 1-3, wherein the platform is to determine a content characteristic or an application-defined parameter of the one or more digital images, wherein the application-defined parameter is defined by the computer application, and select the computer vision algorithm based on the content characteristic or the application-defined parameter of the one or more digital images. An Example 5 includes the platform of Example 4, wherein the platform is to analyze the performance of the selected computer vision algorithm on the computer vision task based on the content characteristic or the application-defined parameter of the one or more digital images, and determine a set of algorithm parameters for the selected computer vision algorithm based on analyzing the performance of the selected computer vision algorithm. An Example 6 includes the platform of any of Examples 1-5, wherein the platform is to organize the library of computer vision algorithms according to a plurality of different levels of abstraction, and determine a level of abstraction at which to select the computer vision algorithm based on a characteristic of the computer vision task or a characteristic of the computer application. An Example 7 includes the platform of any of Examples 1-6, wherein the platform is to select a combination of different computer vision algorithms to perform the computer vision task, execute the combination of different computer vision algorithms on the one or more digital images using the parameter, and expose, for use by the computer application, output of the combination of computer vision algorithms executing the computer vision task. An Example 8 includes the platform of any of Examples 1-7, wherein the platform is to determine a hardware computing resource available to perform the computer vision task, estimate the computational performance of the selected computer vision algorithm on the hardware computing resource, and determine an algorithm parameter for use with the selected computer vision algorithm based on the computational performance of the selected computer vision algorithm on the computing resource. An Example 9 includes the platform of any of Examples 1-8, wherein the platform is to select a data store of a plurality of available data stores for use in performing the computer vision task, wherein each of the data stores includes reference data usable to perform the computer vision task, and the platform selects the selected data store based on a content characteristic or an application-defined parameter of the one or more digital images, wherein the application-defined parameter is defined by the computer application. An Example 10 includes the platform of any of Examples 1-9, wherein the platform is to compute a plurality of different performance measures for the selected computer vision algorithm, and determine an algorithm parameter for use with the selected computer vision algorithm based on the plurality of different performance measures. An Example 11 includes the platform of any of Examples 1-10, wherein the platform is to determine an algorithm type of the selected computer vision algorithm, and customize the performance measures for the selected computer vision algorithm based on the algorithm type. An Example 12 includes the platform of any of Examples 1-11, wherein the platform is to predictively characterize the performance of the selected one or more computer vision algorithms without executing the algorithm. An Example 13 includes the platform of any of Example 12, wherein the platform is to predictively characterize the performance of the selected one or more computer vision algorithms based on one or more content characteristics of the one or more digital images and/or one or more application-defined parameters supplied by the computer application. An Example 14 includes the platform of any of Examples 1-13, wherein the platform is to characterize the performance of the selected one or more computer vision algorithms by executing the selected one or more computer vision algorithms on the one or more digital images and analyzing the output of the selected one or more computer vision algorithms.

In an Example 15, a platform for providing computer vision and learning algorithm services to user-oriented computer applications includes, embodied in one or more machine accessible storage media: an application-algorithm interface to determine application parameters to perform a computer vision or learning task on digital content, the computer vision or learning task received from a computer application, at least one of the application parameters indicating a characteristic of the digital content; an algorithm capabilities interface to, based on the application parameters, identify candidate computer vision or learning algorithms to perform the computer vision or learning task on the digital content based on the application parameters; and a performance interface to evaluate a capability of each of the candidate computer vision or learning algorithms to perform the computer vision or learning task on the digital content, the performance capability determined at least in part by the characteristic of the digital content. An Example 16 includes the platform of Example 15, wherein the platform is to select a computer vision or learning algorithm of the candidate computer vision or learning algorithms based on the evaluating of the capability of the selected computer vision or learning algorithm to perform the computer vision or learning task on the digital content. An Example 17 includes the platform of Example 16, including an algorithms parameter mapping module to map the application parameters to one or more algorithm parameters to use with the selected computer vision or learning algorithm to perform the computer vision or learning task on the digital content. An Example 18 includes the platform of Example 17, wherein the platform is to perform the computer vision or learning task on the digital content by executing the selected computer vision or learning algorithm using the one or more algorithm parameters. An Example 19 includes the platform of Example 18, wherein the platform is to communicate a result of executing the selected computer vision or learning algorithm to the computer application. An Example 20 includes the platform of any of Examples 15-19, including an algorithm organization framework to organize the candidate computer vision or learning algorithms according to a plurality of different levels of abstraction, and wherein the platform is to select a level of abstraction based on the computer vision or learning task. An Example 21 includes the platform of any of Examples 15-20, including a computational performance interface to determine a hardware computing resource available to perform the computer vision or learning task, and estimate the computational performance of each of the candidate computer vision or learning algorithms on the hardware computing resource. An Example 22 includes the platform of any of Examples 15-21, including a task performance interface to compute a plurality of different performance measures for each of the candidate computer vision or learning algorithms, and select the computer vision or learning algorithm based on the plurality of different performance measures. An Example 23 includes the platform of any of Examples 15-22, including a data organization service to index a plurality of reference data for use by the platform in executing the computer vision or learning algorithms. An Example 24 includes the platform of any of Examples 15-23, including a plurality of application programming interfaces to expose computer vision or learning algorithms for use at a plurality of different levels of abstraction.

In an Example 25, a method for providing machine learning algorithm services to computer applications includes, with at least one computing device: determining a parameter relating to a machine learning task of a computer application; evaluating a capability of a plurality of machine learning algorithms to perform the machine learning task with the parameter; selecting a machine learning algorithm of the plurality of machine learning algorithms based on the evaluating of the capability of the machine learning algorithms to perform the machine learning task with the parameter; performing the machine learning task by executing the selected machine learning algorithm with the parameter; and communicating a result of the executing of the machine learning algorithm to the computer application.

An Example 26 includes the method of Example 25, wherein the machine learning task includes analyzing digital content, and the method includes determining the parameter based on an attribute of the digital content. An Example 27 includes the method of Example 26, including using the attribute of the digital content to determine a performance characteristic of the machine learning algorithm. An Example 28 includes the method of Example 27, including determining the performance characteristic of the machine learning algorithm by executing a content clustering technique based on the attribute of the digital content. An Example 29 includes the method of any of Examples 25-28, wherein the machine learning task includes analyzing one or more digital images, and the method includes algorithmically extracting a content characteristic from a digital image, computing distances between the digital image and each of a plurality of clusters of stored digital images, wherein the distances are computed based on the extracted content characteristic, selecting a cluster having a shortest computed distance to the digital image, and executing the selected machine learning algorithm on the digital image using a parameter associated with the selected cluster. An Example 30 includes the method of any of Examples 25-29, wherein the machine learning algorithms are organized according to a plurality of different levels of abstraction, and the method includes selecting a level of abstraction based on the machine learning task and/or the parameter. An Example 31 includes an Internet-based service including instructions embodied in one or more machine accessible storage media, the instructions executable by one or more processors to perform the method of any of Examples 25-30. An Example 32 includes one or more machine accessible storage media having embodied therein a plurality of instructions executable by a processor to perform the method of any of Examples 25-30.

GENERAL CONSIDERATIONS

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine (e.g., a computing device or a "virtual machine" running on one or more computing devices). For example, a machine-readable medium may include any suitable form of volatile or non-volatile memory.

Modules, data structures, blocks, and the like are referred to as such for ease of discussion, and are not intended to imply that any specific implementation details are required. For example, any of the described modules and/or data structures may be combined or divided into sub-modules, sub-processes or other units of computer code or data as may be required by a particular design or implementation. In the drawings, specific arrangements or orderings of schematic elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application-programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure. This disclosure is to be considered as exemplary and not restrictive in character, and all changes and modifications that come within the spirit of the disclosure are desired to be protected.

The invention claimed is:

1. A platform for providing computer vision algorithm services, the platform comprising an application-algorithm interface, the application-algorithm interface comprising a plurality of instructions embodied in one or more non-transitory machine accessible storage media, the application-algorithm interface to:
   receive a computer vision task from a computer application, the computer vision task to be performed on one or more digital images accessed by the computer application;
   determine one or more parameters relating to the performing of the computer vision task on the one or more digital images;
   select one or more computer vision algorithms from a library of computer vision algorithms based on capabilities of the computer vision algorithms that have a high level of performance in comparison to the capabilities of the other computer vision algorithms in the library of computer vision algorithms to perform the computer vision task on the one or more digital images with the one or more parameters;
   expose, for use by the computer application, output of the selected computer vision algorithm performing the computer vision task on the one or more digital images using the one or more parameters; and
   wherein the platform is to organize the library of computer vision algorithms according to a plurality of different levels of abstraction and determine a level of abstraction at which to select the computer vision algorithm based on a characteristic of the computer vision task or a characteristic of the computer application.

2. The platform of claim 1, wherein the platform is to execute one or more algorithm performance characterization techniques to determine the one or more parameters relating to the performing of the computer vision task.

3. The platform of claim 2, wherein the platform is to map one or more application parameters supplied by the computer application to one or more algorithm parameters of the selected computer vision algorithms based on the executing of the one or more algorithm performance characterization techniques.

4. The platform of claim 1, wherein the platform is to determine a content characteristic or an application-defined parameter of the one or more digital images, wherein the application-defined parameter is defined by the computer application, and select the computer vision algorithm based on the content characteristic or the application-defined parameter of the one or more digital images.

5. The platform of claim 4, wherein the platform is to analyze the performance of the selected computer vision algorithm on the computer vision task based on the content characteristic or the application-defined parameter of the one or more digital images, and determine a set of algorithm parameters for the selected computer vision algorithm based on analyzing the performance of the selected computer vision algorithm.

6. The platform of claim 1, wherein the platform is to select a combination of different computer vision algorithms to perform the computer vision task, execute the combination of different computer vision algorithms on the one or more digital images using the parameter, and expose, for use by the computer application, output of the combination of computer vision algorithms executing the computer vision task.

7. The platform of claim 1, wherein the platform is to determine a hardware computing resource available to perform the computer vision task, estimate the computational performance of the selected computer vision algorithm on the hardware computing resource, and determine an algorithm parameter for use with the selected computer vision algorithm based on the computational performance of the selected computer vision algorithm on the computing resource.

8. The platform of claim 1, wherein the platform is to select a data store of a plurality of available data stores for use in performing the computer vision task, wherein each of the data stores comprises reference data usable to perform the computer vision task, and the platform selects the selected data store based on a content characteristic or an application-defined parameter of the one or more digital images, wherein the application-defined parameter is defined by the computer application.

9. The platform of claim 1, wherein the platform is to compute a plurality of different performance measures for the selected computer vision algorithm, and determine an algorithm parameter for use with the selected computer vision algorithm based on the plurality of different performance measures.

10. The platform of claim 9, wherein the platform is to determine an algorithm type of the selected computer vision algorithm, and customize the performance measures for the selected computer vision algorithm based on the algorithm type.

11. The platform of claim 1, wherein the platform is to predictively characterize the performance of the selected one or more computer vision algorithms without executing the algorithm.

12. The platform of claim 11, wherein the platform is to predictively characterize the performance of the selected one or more computer vision algorithms based on one or more content characteristics of the one or more digital images and/or one or more application-defined parameters supplied by the computer application.

13. The platform of claim 1, wherein the platform is to characterize the performance of the selected one or more computer vision algorithms by executing the selected one or more computer vision algorithms on the one or more digital images and analyzing the output of the selected one or more computer vision algorithms.

14. A platform for providing computer vision and learning algorithm services to user-oriented computer applications, the platform comprising:
  an application-algorithm interface embodied in one or more non-transitory machine accessible storage media, the application-algorithm interface to determine application parameters to perform a computer vision or learning task on digital content, the computer vision or learning task received from a computer application, at least one of the application parameters indicating a characteristic of the digital content;
  an algorithm capabilities interface embodied in one or more non-transitory machine accessible storage media, the algorithm capabilities interface to, based on the application parameters, identify candidate computer vision or learning algorithms to perform the computer vision or learning task on the digital content based on the application parameters;
  a performance interface embodied in one or more non-transitory machine accessible storage media, the performance interface to evaluate a capability of each of the candidate computer vision or learning algorithms to perform the computer vision or learning task on the digital content, the performance capability determined at least in part by the characteristic of the digital content; and
  an algorithm organization framework embodied in one or more non-transitory machine accessible storage media, the algorithm organization framework to organize the candidate computer vision or learning algorithms according to a plurality of different levels of abstraction, wherein the platform is to select a level of abstraction based on the computer vision or learning task.

15. The platform of claim 14, wherein the platform is to select a computer vision or learning algorithm of the candidate computer vision or learning algorithms based on the evaluating of the capability of the selected computer vision or learning algorithm to perform the computer vision or learning task on the digital content.

16. The platform of claim 15, comprising an algorithms parameter mapping module to map the application parameters to one or more algorithm parameters to use with the selected computer vision or learning algorithm to perform the computer vision or learning task on the digital content.

17. The platform of claim 16, wherein the platform is to perform the computer vision or learning task on the digital content by executing the selected computer vision or learning algorithm using the one or more algorithm parameters.

18. The platform of claim 17, wherein the platform is to communicate a result of executing the selected computer vision or learning algorithm to the computer application.

19. The platform of claim 14, comprising a computational performance interface to determine a hardware computing resource available to perform the computer vision or learning task, and estimate the computational performance of each of the candidate computer vision or learning algorithms on the hardware computing resource.

20. The platform of claim 14, comprising a task performance interface to compute a plurality of different performance measures for each of the candidate computer vision or learning algorithms, and select the computer vision or learning algorithm based on the plurality of different performance measures.

21. The platform of claim 14, comprising a data organization service to index a plurality of reference data for use by the platform in executing the computer vision or learning algorithms.

22. The platform of claim 14, comprising a plurality of application programming interfaces to expose computer vision or learning algorithms for use at a plurality of different levels of abstraction.

23. The platform of claim 14, comprising a plurality of application programming modules embodied in one or more non-transitory machine accessible storage media, the application programming modules to expose computer vision or learning algorithms for use at a plurality of different levels of abstraction.

24. A platform for providing computer vision and learning algorithm services to user-oriented computer applications, the platform comprising:
  an application-algorithm interface embodied in one or more non-transitory machine accessible storage media, the application-algorithm interface to determine application parameters to perform a computer vision or learning task on digital content, the computer vision or learning task received from a computer application, at least one of the application parameters indicating a characteristic of the digital content;
  an algorithm capabilities interface embodied in one or more non-transitory machine accessible storage media, the algorithm capabilities interface to, based on the application parameters, identify candidate computer vision or learning algorithms to perform the computer vision or learning task on the digital content based on the application parameters;

a performance interface embodied in one or more non-transitory machine accessible storage media, the performance interface to evaluate a capability of each of the candidate computer vision or learning algorithms to perform the computer vision or learning task on the digital content, the performance capability determined at least in part by the characteristic of the digital content; and a plurality of application programming interfaces each embodied in one or more non-transitory machine accessible storage media, the application programming interfaces to expose computer vision or learning algorithms for use at a plurality of different levels of abstraction.

25. The platform of claim 24, wherein the platform is to select a computer vision or learning algorithm of the candidate computer vision or learning algorithms based on the evaluating of the capability of the selected computer vision or learning algorithm to perform the computer vision or learning task on the digital content.

26. The platform of claim 25, comprising an algorithms parameter mapping module embodied in one or more non-transitory machine accessible storage media, the algorithms parameter mapping module to map the application parameters to one or more algorithm parameters to use with the selected computer vision or learning algorithm to perform the computer vision or learning task on the digital content.

27. The platform of claim 26, wherein the platform is to perform the computer vision or learning task on the digital content by executing the selected computer vision or learning algorithm using the one or more algorithm parameters.

28. The platform of claim 27, wherein the platform is to communicate a result of executing the selected computer vision or learning algorithm to the computer application.

29. The platform of claim 24, comprising a computational performance module embodied in one or more non-transitory machine accessible storage media, the computational performance module to determine a hardware computing resource available to perform the computer vision or learning task, and estimate the computational performance of each of the candidate computer vision or learning algorithms on the hardware computing resource.

30. The platform of claim 24, comprising a task performance module embodied in one or more non-transitory machine accessible storage media, the task performance module to compute a plurality of different performance measures for each of the candidate computer vision or learning algorithms, and select the computer vision or learning algorithm based on the plurality of different performance measures.

31. The platform of claim 24, comprising a data organization service embodied in one or more non-transitory machine accessible storage media, the data organization service to index a plurality of reference data for use by the platform in executing the computer vision or learning algorithms.

* * * * *